(12) United States Patent
Books et al.

(10) Patent No.: US 11,529,941 B2
(45) Date of Patent: Dec. 20, 2022

(54) ELECTRIC ENGINE ACCESSORY CONTROL

(71) Applicant: Cummins Inc., Columbus, IN (US)

(72) Inventors: Martin T. Books, Columbus, IN (US); Mahesh Madurai Kumar, Columbus, IN (US); Robert Dziuba, Columbus, IN (US); Praveen Chitradurga Muralidhar, Indianapolis, IN (US); Jeffrey S. Rauch, Columbus, IN (US); Joseph E. Paquette, Columbus, IN (US)

(73) Assignee: Cummins Inc., Columbus, IN (US)

( * ) Notice: Subject to any disclaimer, the term of this patent is extended or adjusted under 35 U.S.C. 154(b) by 62 days.

(21) Appl. No.: 17/247,341

(22) Filed: Dec. 8, 2020

(65) Prior Publication Data

US 2021/0086745 A1 Mar. 25, 2021

Related U.S. Application Data

(60) Division of application No. 16/183,477, filed on Nov. 7, 2018, now Pat. No. 10,882,509, which is a
(Continued)

(51) Int. Cl.
*B60W 10/30* (2006.01)
*B60W 30/18* (2012.01)
(Continued)

(52) U.S. Cl.
CPC ............ *B60W 10/30* (2013.01); *B60K 6/448* (2013.01); *B60R 16/0236* (2013.01);
(Continued)

(58) Field of Classification Search
CPC ....... B60W 10/30; B60W 30/18; B60K 6/448; B60K 1/00; B60R 16/0236; Y02T 10/84
See application file for complete search history.

(56) References Cited

U.S. PATENT DOCUMENTS 4,489,242 A 12/1984 Worst
5,291,960 A 3/1994 Brandenburg et al.
(Continued)

FOREIGN PATENT DOCUMENTS

CN 102069795 11/2013
EP 0 537 873 A1 4/1993
(Continued)

OTHER PUBLICATIONS

International Search Report and Written Opinion for International Application No. PCT/US2015/046552, dated Nov. 27, 2015, 7 pages.

*Primary Examiner* — Marthe Y Marc-Coleman
(74) *Attorney, Agent, or Firm* — Foley & Lardner LLP

(57) ABSTRACT

A method of controlling a vehicle accessory includes determining a transmission of a vehicle is in a non-park setting; in response to determining the transmission of the vehicle is in the non-park setting, receiving speed data indicative of a speed of the vehicle; determining a speed to operate the vehicle accessory based on the vehicle speed; comparing the determined speed to operate the vehicle accessory to a speed threshold; and in response to determining that the determined speed is below the speed threshold, providing a command to the vehicle accessory to one of deactivate the vehicle accessory or operate the vehicle accessory at a reduced operating state relative to a current operating state of the vehicle accessory.

20 Claims, 6 Drawing Sheets

Related U.S. Application Data continuation of application No. 15/506,135, filed as application No. PCT/US2015/046552 on Aug. 24, 2015, now Pat. No. 10,124,785.

(60) Provisional application No. 62/041,978, filed on Aug. 26, 2014.

(51) Int. Cl.
 *B60R 16/023* (2006.01)
 *B60K 6/448* (2007.10)
 *B60K 1/00* (2006.01)

(52) U.S. Cl.
 CPC ............... *B60W 30/18* (2013.01); *B60K 1/00* (2013.01); *Y02T 10/84* (2013.01)

(56) References Cited

U.S. PATENT DOCUMENTS

| | | |
|---|---|---|
| 5,637,933 A | 6/1997 | Rawlings et al. |
| 5,898,282 A | 4/1999 | Drozdz et al. |
| 6,036,449 A | 3/2000 | Nishar et al. |
| 6,465,908 B1 | 10/2002 | Karuppana et al. |
| 6,474,950 B1 | 11/2002 | Waldo |
| 6,598,496 B2 | 7/2003 | Pannell |
| 6,700,386 B2 | 3/2004 | Egami |
| 6,863,139 B2 | 3/2005 | Egami et al. |
| 6,982,540 B2 | 1/2006 | Richter et al. |
| 7,026,724 B1 | 4/2006 | Blackburn |
| 7,028,793 B2 | 4/2006 | Hu et al. |
| 7,059,279 B2 | 6/2006 | Bystedt et al. |
| 7,076,350 B2 | 7/2006 | Lvarez-Troncoso et al. |
| 7,098,555 B2 | 8/2006 | Glahn et al. |
| 7,119,454 B1 | 10/2006 | Chiao |
| 7,360,615 B2 | 4/2008 | Salman et al. |
| 7,694,250 B2 | 4/2010 | Boutin |
| 7,753,147 B2 | 7/2010 | Usoro |
| 7,805,229 B1 | 9/2010 | Blackwell et al. |
| 8,035,349 B2 | 10/2011 | Lubawy |
| 8,097,974 B2 | 1/2012 | Esaka et al. |
| 8,116,955 B2 | 2/2012 | Huseman |
| 8,148,924 B2 | 4/2012 | Ohkuwa et al. |
| 8,186,466 B2 | 5/2012 | Verbrugge et al. |
| 8,260,494 B2 | 9/2012 | Yang et al. |
| 8,444,527 B2 | 5/2013 | Usoro |
| 8,467,950 B1 | 6/2013 | Pfefferl et al. |
| 8,489,266 B2 | 7/2013 | Ueda et al. |
| 8,547,055 B2 | 10/2013 | Mack |
| 8,548,660 B2 | 10/2013 | Alte |
| 8,991,536 B2 | 3/2015 | Dieckmann et al. |
| 9,688,260 B2 | 6/2017 | Aixala et al. |
| 10,041,552 B2 | 8/2018 | Ulrey et al. |
| 10,060,427 B2 | 8/2018 | Siuchta et al. |
| 2002/0171392 A1 | 11/2002 | Richter et al. |
| 2004/0253489 A1 | 12/2004 | Horgan et al. |
| 2006/0046895 A1 | 3/2006 | Thacher et al. |
| 2006/0127224 A1 | 6/2006 | Sweet et al. |
| 2007/0209849 A1* | 9/2007 | Usoro ................... B60W 10/08 180/65.25 |
| 2007/0280833 A1 | 12/2007 | Miyake et al. |
| 2008/0292471 A1 | 11/2008 | Sweet et al. |
| 2010/0082198 A1 | 4/2010 | Arai et al. |
| 2010/0179714 A1 | 7/2010 | Tani et al. |
| 2010/0296949 A1 | 11/2010 | Corley |
| 2011/0125351 A1 | 5/2011 | Bauerle |
| 2011/0231047 A1 | 9/2011 | Aixala et al. |
| 2011/0259189 A1 | 10/2011 | Diekmeyer et al. |
| 2012/0107138 A1 | 5/2012 | Kreso et al. |
| 2012/0186241 A1 | 7/2012 | De Miranda et al. |
| 2012/0316713 A1 | 12/2012 | Pfefferl et al. |
| 2013/0000295 A1 | 1/2013 | Bissontz |
| 2013/0001006 A1 | 1/2013 | Gibson et al. |
| 2013/0204490 A1 | 8/2013 | Pfefferl et al. |
| 2013/0231808 A1 | 9/2013 | Flath et al. |
| 2013/0333969 A1 | 12/2013 | Dieckmann et al. |
| 2014/0001847 A1 | 1/2014 | Khandelwal |
| 2014/0012450 A1 | 1/2014 | Laing |
| 2014/0020075 A1 | 1/2014 | Bhagavatula et al. |
| 2014/0034009 A1 | 2/2014 | Brinkmann et al. |
| 2014/0049381 A1 | 2/2014 | Moon et al. |
| 2014/0200755 A1 | 7/2014 | Sisk et al. |
| 2014/0200756 A1 | 7/2014 | Sisk |
| 2014/0200763 A1 | 7/2014 | Sisk |
| 2014/0236467 A1 | 8/2014 | Liu et al. |
| 2014/0369853 A1 | 12/2014 | Siuchta et al. |
| 2015/0219083 A1 | 8/2015 | Huffman et al. |
| 2015/0367834 A1 | 12/2015 | Runde et al. |
| 2016/0075324 A1 | 3/2016 | Brombach et al. |
| 2016/0153385 A1 | 6/2016 | Pursifull |
| 2016/0184763 A1 | 6/2016 | Wimmer et al. |
| 2016/0264126 A1 | 9/2016 | Ketfi-Cherif et al. |
| 2017/0001481 A1 | 1/2017 | Kraayenbrink et al. |
| 2017/0015176 A1 | 1/2017 | Ulrey et al. |
| 2017/0282889 A1 | 10/2017 | Books et al. |
| 2017/0305372 A1 | 10/2017 | Adler et al. |
| 2017/0355371 A1 | 12/2017 | Higgins |

FOREIGN PATENT DOCUMENTS

| | | | | |
|---|---|---|---|---|
| EP | 2514620 A1 * | 10/2012 | ............ | B60K 6/383 |
| JP | 2004-194495 | 7/2004 | | |
| KR | 2009062867 | 6/2009 | | |
| WO | WO-2012106787 A1 * | 8/2012 | ............ | E05F 15/70 |
| WO | WO-2012/128770 A1 | 9/2012 | | |
| WO | WO-2014/020075 A1 | 7/2014 | | |
| WO | WO-2014/109887 A2 | 7/2014 | | |

\* cited by examiner

ELECTRIC ENGINE ACCESSORY CONTROL

CROSS-REFERENCE TO RELATED PATENT APPLICATIONS

The present application is a divisional application of U.S. application Ser. No. 16/183,477, filed Nov. 7, 2018 and entitled "ELECTRIC ENGINE ACCESSORY CONTROL," which is a continuation application of U.S. application Ser. No. 15/506,135, filed Feb. 23, 2017 and entitled "ELECTRIC ENGINE ACCESSORY CONTROL," which is a U.S. national stage application of International Application No. PCT/US2015/046552, filed on Aug. 24, 2015, which claims the benefit of and priority to U.S. Provisional Patent Application No. 62/041,978, filed Aug. 26, 2014, titled "ELECTRIC ENGINE ACCESSORY CONTROL." All of these applications are incorporated herein by reference in their entireties.

TECHNICAL FIELD

The present disclosure relates to vehicular accessory devices. More particularly, the present disclosure relates to control of electrically-powered vehicle accessories.

BACKGROUND

With the advent of new automotive technologies such as hybrid vehicles and the new presence of an ample electrical energy supply on vehicle, a natural and common outcome is the electrification of engine and vehicle accessories that have traditionally been belt driven off of the engine. These accessories include air compressors (for pneumatic devices), air conditioning, power steering pumps, engine coolant pumps, fans, etc. Like much of the hybrid vehicle technology, it would seem desirable to drive these devices more heavily during regenerative braking events where the driving energy is considered free, while turning these devices off entirely when it would force the engine to increase fueling. The complication is that hybrid technologies are most beneficial and most often used in highly transient stop-and-go driving scenarios, such as urban transit buses. In these drive cycles, regenerative braking events can be very brief. As a result, if these devices are to be manipulated to take advantages of these brief braking events, their reaction time must be quick and ON/OFF transient inefficiencies must be small. But, the reality is that the reaction times are often not quick and the ON/OFF transient inefficiencies are not small.

SUMMARY

One embodiment relates to a method of controlling electrically-powered vehicle accessories. The method includes receiving energy data, the energy data providing an indication of an availability of free energy; receiving an electrically-powered vehicle accessory classification for an electrically-powered vehicle accessory, the classification including one of a critical and a discretionary electrically-powered vehicle accessory; receiving a prioritization for the electrically-powered vehicle accessory based on the classification and whether the electrically-powered vehicle accessory has an energy storage component; and providing a command to control energy consumption by the electrically-powered vehicle accessory based on its prioritization and the availability of free energy. By classifying electrically-powered accessories as discretionary or critical and using free energy, the controller is able to optimally control such accessories to reduce overall energy consumption while substantially achieving desired vehicle operability characteristics.

Another embodiment relates to an apparatus. The apparatus includes a free energy module, a classification module, a prioritization module, and an accessory load management module. The free energy module is structured to determine that free energy is available. The classification module is structured to receive a classification of an electrically-powered vehicle accessory, the classification including one of a critical and a discretionary electrically-powered vehicle accessory. The prioritization module is structured to prioritize management of the electrically-powered vehicle accessories based on the classification and whether the electrically-powered vehicle accessory has an energy storage component. The accessory load management module is structured to include a specific power management control process for each electrically-powered vehicle accessory and provide a command to control energy consumption by the electrically-powered vehicle accessory in accord with its specific power management control process based on its prioritization and the availability of free energy.

Still another embodiment relates to a system. The system includes a regenerative braking system and a controller communicably coupled to the regenerative braking system. The controller is structured to determine that free energy is available based on operation of the regenerative braking system; receive an electrically-powered vehicle accessory classification for an electrically-powered vehicle accessory, the classification including one of a critical and a discretionary electrically-powered vehicle accessory; receive a prioritization of the electrically-powered vehicle accessory based on the classification and whether the electrically-powered vehicle accessory has an energy storage component; and provide a command to control energy consumption by the electrically-powered vehicle accessory based on the prioritization and the availability of free energy.

Yet another embodiment relates to an apparatus. The apparatus includes a free energy module, a classification module, and an accessory load management module. The free energy module is structured to determine that free energy is available. The classification module is structured to receive a classification of an electrically-powered vehicle accessory. The classification includes a spectrum position from discretionary to critical electrically-powered vehicle accessories. The accessory load management module is structured to provide a command to manage the electrically-powered vehicle accessory based on its classification and the availability of free energy.

These and other features, together with the organization and manner of operation thereof, will become apparent from the following detailed description when taken in conjunction with the accompanying drawings.

DETAILED DESCRIPTION

Figure 1:
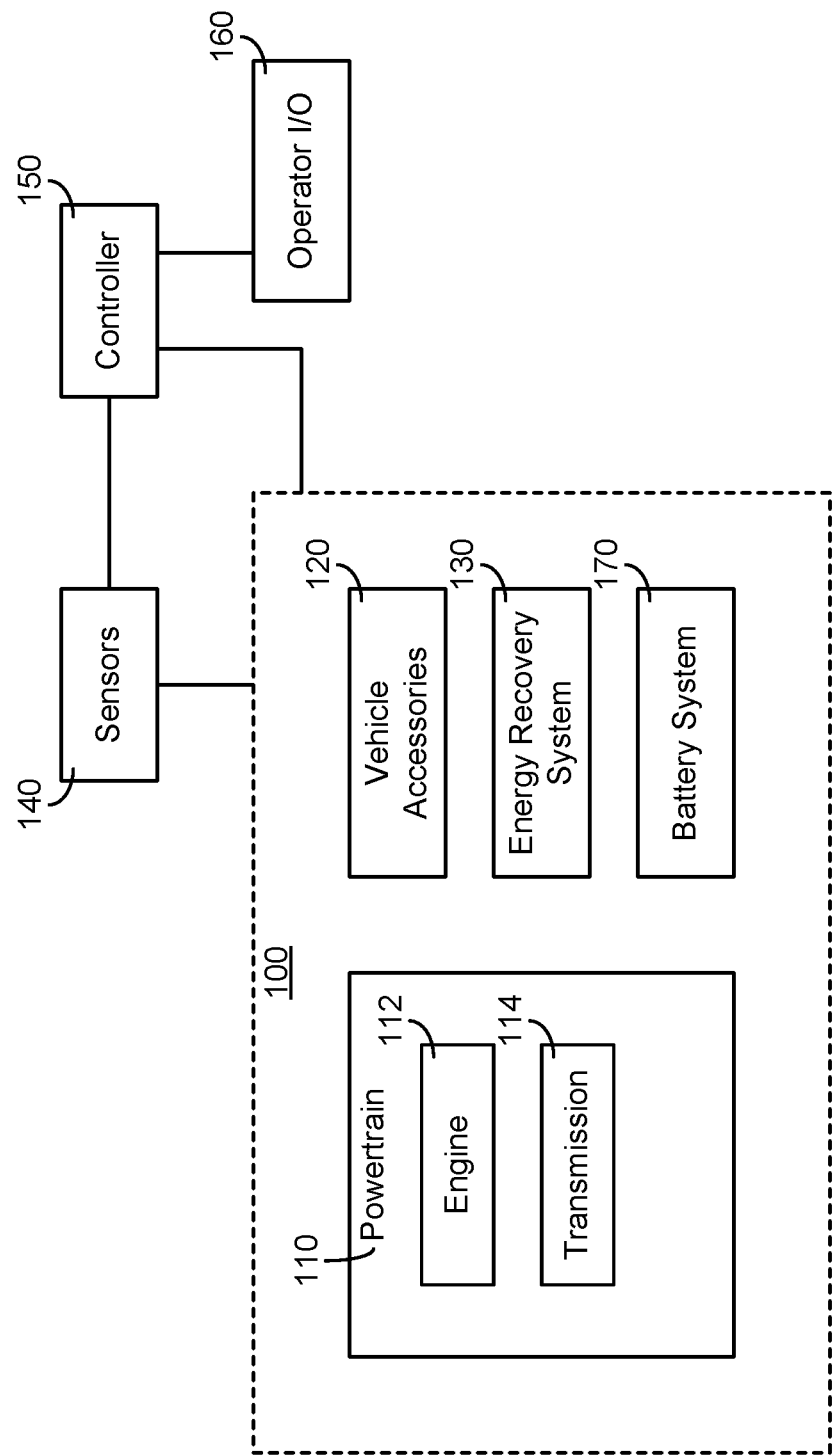
FIG. 1 is schematic diagram of a vehicle with a controller, according to an example embodiment.

Referring to the Figures generally, the various embodiments disclosed herein relate to systems and methods of managing electrically-powered vehicle accessories. Being electrically-powered, these vehicle accessories are able to be driven largely independent of the engine of a vehicle (e.g., not driven off of a belt coupled to the engine). Electrically-powered vehicle accessories may include, but are not limited to, air compressors (for pneumatic devices), air conditioning systems, power steering pumps, engine coolant pumps, fans, and the like. According to the present disclosure, a vehicle controller differentiates between critical and discretionary electrically-powered accessories and manages their energy consumption differently based on that classification. In some instances, the controller uses energy data to determine whether "free energy" is available and provides a command to direct the free energy to accessories with an energy storage component. Accordingly, those accessories may operate for longer periods of time without needing to use non-free energy. As described more fully herein, management of critical vehicle accessories generally involves avoiding or rarely turning the accessory completely off, but driving it at a lower energy consumption state (e.g., operate the coolant pump at fifty-percent maximum speed). In comparison, management of discretionary vehicle accessories is generally based on the discretionary accessories' primary function, its impact on engine loading, and the availability of free energy. In some embodiments, the controller implements a specific energy consumption management strategy with each electrically-powered vehicle accessory to optimize operation of the electrically-powered accessories.

As used herein, the term "free energy" refers to energy (e.g., electricity) that is otherwise lost and/or at a relatively lower cost. Free energy may be recovered using an energy recovery system (e.g., energy recovery system 130). In one example, the energy recovery system is structured as a regenerative braking system. In the regenerative braking configuration, as an operator of a vehicle applies the brake pedal, an electric motor reverses directions (electrically) and generates electricity. This electricity may be stored in one or more batteries of the vehicle and used to power one or more components. In comparison, non-free energy refers to energy expenditures for a specific purpose. For example, non-free energy would include utilizing a fuel to power an internal combustion engine to power or drive an accessory of the vehicle, such as a fan. Here, although fuel may be used to power the internal combustion engine, the free energy (from the regenerative braking system) is generated as a by-product of operation of the internal combustion engine. This is energy that would otherwise be lost as, for example, heat. As mentioned above, the term "free energy" also refers to energy that is at a relatively lower cost. During vehicle operation, the availability of energy changes over time. For example, free energy via regenerative braking only occurs during operation of the brakes. However, at some portions of vehicle operation, energy used to power various components may be minimized (e.g., the radio/stereo is turned off). During these times, a relatively greater amount of energy may be available for use with other devices, which corresponds with this energy being at a relatively lower cost than normal. According to the present disclosure, the controller makes use of energy that is free—as in reclaimed and/or relatively less expensive—to optimize energy consumption of vehicle accessories. Specifically, the controller increases consumption of those accessories with quick reaction times and/or energy storage components when the energy is free.

As also used herein, the phrase "management of electrically-powered vehicle accessories" is intended to include any type of control used with the accessories including, but not limited to starting/stopping the device and/or changing operation parameters of the device (e.g., a lower speed or operating state). Utilizing these controls, the controller of the present disclosure is able to manage energy consumption by each device.

Referring now to FIG. 1, FIG. 1 shows a schematic diagram of a vehicle 100 with a controller 150 according to an example embodiment. The vehicle 100 may be an on-road or an off-road vehicle including, but not limited to, line-haul trucks, mid-range trucks (e.g., pick-up truck), tanks, airplanes, and any other type of vehicle that utilizes electrically-powered accessories. Although FIG. 1 depicts the vehicle 100 as including an internal combustion engine 112, the vehicle 100 may be powered by any type of engine system. For example, the vehicle 100 may be a hybrid vehicle, a full electric vehicle, and/or an internal combustion engine powered vehicle as shown.

As shown, the vehicle 100 generally includes a powertrain system 110, vehicle accessories 120, an energy recovery system 130, a battery system 170, sensors 140 communicably coupled to one or more components of the vehicle 100, a controller 150, and an operator input/output ("I/O") device 160. While the sensors 140, controller 150, and I/O device 160 are shown external to the vehicle 100, this is done for clarity as according to one example embodiment, all of these components are included with the vehicle 100. These components are described more fully herein.

Communication between and among the components of the vehicle 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data from one or more of the components shown in FIG. 1. For example, the data may include vehicle operating data (e.g., engine speed, vehicle speed, engine temperature, etc.) received via one or more sensors, such as sensors 140. As another example, the data may include an input from operator I/O device 160. As described more fully herein, with this data, the controller 150 dynamically controls energy consumption of electrically-powered vehicle accessories.

As shown in FIG. 1, the powertrain system 110 includes an engine 112 and a transmission 114, where the engine 112 is operatively coupled to the transmission 114. Although not depicted, the powertrain system may also include a drive shaft, a differential, and a final drive. As a brief overview, the engine 112 receives a chemical energy input (e.g., a fuel such as gasoline or diesel) and combusts the fuel to generate mechanical energy, in the form of a rotating crankshaft. The transmission 114 receives the rotating crankshaft and manipulates the speed of the crankshaft (i.e., the engine RPM) to effect a desired drive shaft speed. The rotating drive shaft is received by the differential, which provides the rotation energy of the drive shaft to the final drive. The final drive then propels or moves the vehicle 100.

The engine 112 may be structured as any internal combustion engine (e.g., compression-ignition or spark-ignition), such that it can be powered by any fuel type (e.g., diesel, ethanol, gasoline, etc.). Similarly, the transmission 114 may be structured as any type of transmission, such as a continuous variable transmission, a manual transmission, an automatic transmission, an automatic-manual transmission, a dual clutch transmission, etc. As mentioned above, according to an alternate embodiment, the engine 112 may be configured as a full electric or partial electric engine (i.e., a full electric vehicle or a hybrid powered vehicle).

The vehicle 100 is also shown to include vehicle accessories 120. The vehicle accessories 120 include both electrically-powered vehicle accessories and engine 112 driven vehicle accessories. The electrically-powered vehicle accessories may receive power from the energy recovery system 130 and/or the battery system 170. As described more fully herein, the controller 150 regulates/manages the power delivered from either one or both of the energy recovery system 130 and the battery system 170 to the electrically-powered vehicle accessories in order to optimize their operation and reduce overall energy consumption in the vehicle 100. In addition to reducing overall energy consumption, optimized control of the accessories may also lead to a reduction in fuel consumption for the engine 112 due to a relatively lesser amount of fuel being needed to power the alternator and, ultimately, the electrically-powered accessory. The electrically-powered vehicle accessories may include, but are not limited to, air compressors (for pneumatic devices), air conditioning systems, power steering pumps, engine coolant pumps, fans, and the like.

The vehicle 100 is also shown to include an energy recovery system 130. The energy recovery system 130 is structured recover energy expenditures from operation of the vehicle 100. This recovered energy may be re-purposed for other uses, such as driving one or more of the electrically-powered accessories. In one example, the energy recovery system 130 is structured as a regenerative braking system for the vehicle 100. Accordingly, when an operator of the vehicle applies the brakes in the vehicle, one or more electric motors coupled to the brakes reverses torque direction to slow the vehicle down. The reverse direction of torque generates electricity. Among other destinations, this electricity may be provided to the electrically-powered vehicle accessories 120 and/or the battery system 170. The battery system 170 is structured to also provide electrical energy to one or more components, such as the electrically-powered vehicle accessories, in the vehicle 100. Accordingly, the battery system 170 may include one or more batteries (e.g., a 12 volt automotive battery, a high voltage Li-ion battery, etc.), an alternator, a motor/generator, and any other components used with a vehicle battery system (e.g., battery cables, wiring harnesses, voltage regulators, etc.). In one embodiment, energy recovered from the energy recovery system 130 may be directed to and stored by the battery system 170.

The operator input/output device 160 enables an operator of the vehicle 100 (or another passenger; or manufacturing, service, or maintenance personnel) to communicate with the vehicle 100 and the controller 150. For example, the operator input/output device 160 may include, but is not limited to, an interactive display, a touchscreen device, one or more buttons and switches, voice command receivers, etc. Via the operator input/output device 160, the user may prioritize and classify various electrically-powered vehicle accessories.

With this prioritization and classification, the controller 150 may adjust the energy management strategy used with the accessories in the vehicle. This is explained more fully in regard to FIGS. 2-3. It should be noted, however, that in some embodiments, the classification and prioritization may be calibrated within the controller 150 such that only certain users (e.g., service personnel) are allowed to change these specifications.

As the components of FIG. 1 are shown to be embodied in a vehicle 100, the controller 150 may be structured as an electronic control module ("ECM"). The ECM may include a transmission control unit and any other vehicle control unit (e.g., exhaust aftertreatment control unit, powertrain control module, engine control module, etc.). The function and structure of the controller 150 is described in greater detail in FIG. 2.

Figure 2:
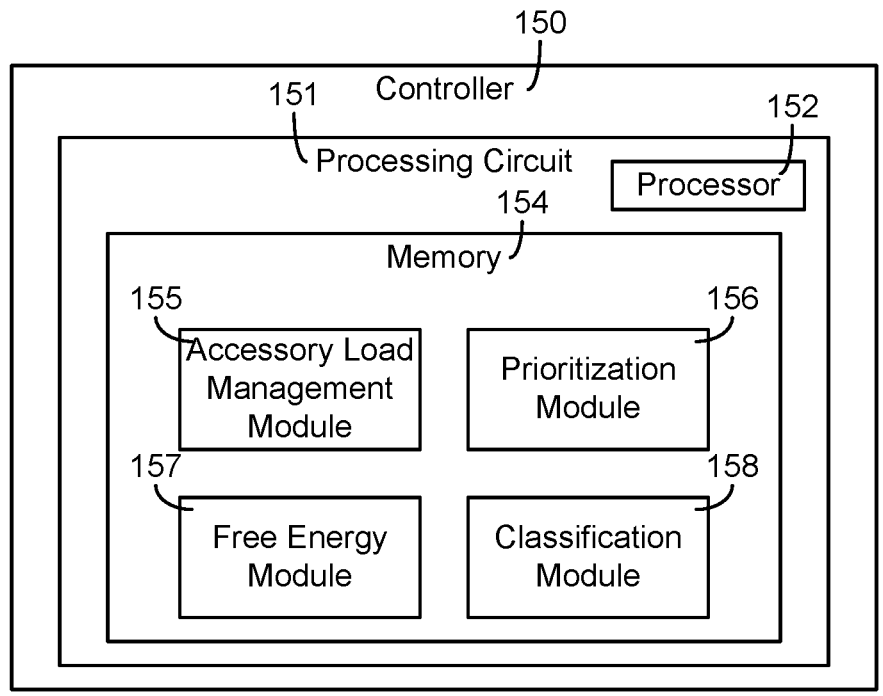
FIG. 2 is a schematic of a controller used with the system of FIG. 1, according to an example embodiment.

As such, referring now to FIG. 2, the function and structure of the controller 150 are shown according to one embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., NVRAM, RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes modules configured to optimize control of electrically-powered vehicle accessories alone and in combination with vehicles that include an energy recovery system, such as energy recovery system 130. While various modules with particular functionality are shown in FIG. 2, it should be understood that the controller 150 and memory 154 may include any number of modules for completing the functions described herein. For example, the activities of multiple modules may be combined as a single module, additional modules with additional functionality may be included, etc. Further, it should be understood that the controller 150 may further control other vehicle activity beyond the scope of the present disclosure.

As shown, the controller 150 includes an accessory load management module 155, a prioritization module 156, a free energy module 157, and a classification module 158. The free energy module 157 is structured to determine when free energy is available during operation of the vehicle 100. In one configuration, one or more sensors 140 may be communicably coupled to the energy recovery system 130 and the controller 150. The sensors 140 may acquire energy data that indicates when free energy is available. In some embodiments, the sensors 140 may also provide an indication of the quantity of free energy available. As such, the free energy module 157 may include communication circuitry (e.g., relays, wiring, network interfaces, circuits, etc.) that facilitate the exchange of information, data, values, non-transient signals, etc. between and among the free energy module 157 and the one or more sensors 140. In some embodiments, the free energy module 157 may include or be communicably coupled to the energy recovery system 130 as a means for controlling operation of and/or communicating with the energy recovery system 130. In one embodiment, when the energy recovery system 130 is structured as a regenerative braking system, the sensors 140 provide energy data that indicates when the regenerative braking system is active (i.e., in a generating state) such that free energy may be acquired and utilized. For example, the energy data may include an indication of a brake pedal position, when the electric motors on the brakes are in operation, and any other data point that provides an indication of when the regenerative braking system is active. In another example, as mentioned above, the free energy may correspond with energy that is relatively less expensive than during normal operation (e.g., a relatively greater amount of energy is available when the vehicle radio is turned off). Accordingly, the free energy module 157 is also structured to determine when this type of free energy (i.e., relatively lower cost energy) is available. In turn, the sensors 140 may provide energy data that indicates when energy is at a relatively lower cost. This situation may correspond with when certain devices are turned off, one or more energy storage components have a stored energy level above a threshold (i.e., there is an abundance of energy that may be repurposed), and the like. Accordingly, the sensors 140 may be located on each vehicle accessory (to determine when the accessory is on full-power, less than full-power, or off), on any energy storage component, and any other position that indicated when the energy is available at a relatively lower cost.

As an example, a position sensor 140 may be mounted on the brake pedal in a vehicle. The sensor provides data to the controller regarding the position of the brake pedal. Accordingly, the controller 150 may determine when the brake pedal is depressed. In this example, when the brake pedal is depressed, regenerative braking is occurring. As such, the controller 150 determines that free energy is available. As soon as the sensor provides data that the brake pedal is no longer depressed, the controller 150 may determine that free energy is no longer available. Although described in regard to the brake pedal position, the same type of sensor reading may be provided in regard to other data points. For example, a rapid decrease in vehicle speed may indicate the occurrence of braking and, therefore, that free energy is available. Thus, while only a few data points are shown as representatives of when free energy available, a wide variety of other data points may also be sampled to provide an indication.

The classification module 158 is structured to receive a classification of one or more electrically-powered vehicle accessories. As such, the classification module 158 may include communication circuitry (e.g., relays, wiring, network interfaces, circuits, etc.) that facilitate the exchange of information, data, values, non-transient signals, etc. between and among the classification module 158 and the operator I/O device 160. In another embodiment, the classification module 158 includes communication circuitry (e.g., relays, wiring, network interfaces, circuits, etc.) that facilitate the exchange of information, data, values, non-transient signals, etc. between and among the classification module 158 and electrically-powered vehicle accessories to determine the classification of the electrically-powered vehicle accessories. In still another embodiment, the classification module 158 includes machine-readable content or media for facilitating the exchange of information between the one or more vehicle accessories and the controller 150. In yet another embodiment, the classification module 158 includes any combination of machine-readable content and hardware components.

In one embodiment, the classification includes a spectrum position from discretionary to critical electrically-powered vehicle accessories. Accordingly, electrically-powered vehicle accessories may fall anywhere within that spectrum (i.e., relatively more critical versus relatively more discretionary). As an example, via the I/O device 160, a user may designate an accessory—air compressor—and move a bar between the two end points (critical and discretionary) to classify or otherwise delineate the position of the air compressor relative to the other accessories. Management of the accessories is then based on whether the accessories are relatively more critical or relatively more discretionary. In another example embodiment, the classification may be either critical or discretionary (i.e., binary).

Critical accessories are those such as a power steering pump or an engine coolant pump, whose function is essential or substantially essential for vehicle durability and operation. For example, a non-functioning engine coolant pump may cause the engine to overheat, which may result in failure of the engine. In comparison, discretionary accessories are devices that function to provide driver comfort or to satisfy a need that is only intermittently present (e.g. recharging the air tank). Discretionary accessories may include, but are not limited to, an air conditioner compressor or an air compressor for operating vehicle pneumatics. The classification of critical or discretionary (and, relatively more critical or relatively more discretionary) may also be based on reaction times of the accessories: devices with relatively slower reaction times being classified as critical or relatively more critical and devices with relatively faster reaction times being classified as discretionary or relatively more discretionary. This concept is explained in more detail below.

In addition to receiving the abovementioned classifications, the vehicle accessories may also receive a classification as to whether they include an energy storage component (e.g., an accumulator or a battery). Energy storage capability allows the use of higher power usage now to offset some power consumption at some point in the future. For example, an air compressor for vehicle pneumatics converts mechanical energy into pneumatic energy usually stored in an air tank; increased compressor operation now can offset compressor operation in the future, through the use of increased stored compressed air. Similarly, the engine or motor cooling system regulates the thermal energy stored in the system; increased cooling operation now can be offset by lower cooling effort in the future so long as the system can tolerate the temporary decrease in thermal energy in the interim. In comparison, power steering usually has no storage capability, so it may not be a good candidate for prioritization adjustment. Accordingly, the controller 150 (via the accessory load management module 155) provides those accessories with the greatest energy storage capability with the highest priority during braking or "free energy" events. Devices without energy storage capability are substantially unaffected. In one embodiment, as described below, although the controller 150 manages critical accessories over discretionary accessories, the prioritization module 156 provides a command to utilize any free energy when available with substantially only devices with an energy storage component (critical or discretionary). In this sense, the energy management strategy is augmented or modified in real-time based on the energy data.

Accordingly, the prioritization module 156 is structured to receive a prioritization for the electrically-powered vehicle accessories based on their classification and whether they have an energy storage component. As such, the prioritization module 156 may include communication circuitry (e.g., relays, wiring, network interfaces, circuits, etc.) that facilitate the exchange of information, data, values, non-transient signals, etc. between and among the prioritization module 156 and the classification module 158. In other embodiments, the prioritization module 156 may include machine-readable content or media for receiving the prioritization. In yet another embodiment, the prioritization module 156 may include any combination of hardware components and machine-readable media.

The prioritization and classification may be defined (e.g., preprogrammed) within the controller 150. As such, the prioritization "received" process corresponds with a pre-programming step of the controller 150 assembly. Therefore, once the controller 150 is inserted in the vehicle 100, the controller 150 is ready to perform the functions described herein. In this case, only certain people (e.g., service personnel) may be permitted to adjust the classification and prioritization settings. In an alternate embodiment, the prioritization and classification of vehicle accessories may be adjustable by vehicle operators to provide them with additional control over their vehicle and vehicular accessories. In one embodiment, the prioritization is as follows: 1) critical (or, relatively more critical) electrically-powered vehicle accessories with no energy storage component; 2) electrically-powered vehicle accessories with an energy storage component; and 3) discretionary (or, relatively more discretionary) electrically-powered vehicle accessories. The prioritization provides a schedule of how energy consumption of the electrically-powered vehicle accessories is managed by the controller 150. This is further described in regard to the accessory load management module 155. In one embodiment, the prioritization may be adjusted by an external device via input/output device 160.

The accessory load management module 155 is structured to control energy consumption by the electrically-powered vehicle accessories based on their prioritization and the availability of free energy. As such, the accessory load management module 155 may include communication circuitry (e.g., relays, wiring, network interfaces, circuits, etc.) that facilitate the exchange of information, data, values, non-transient signals, etc. between and among the accessory load management module 155 and the prioritization module 156 and/or the classification module 158. In another embodiment, the accessory load management module 155 may include the one or more vehicle accessories. In still another embodiment, the accessory load management module 155 may include any combination of hardware components, such as the one or more vehicle accessories, and the machine-readable content.

In one embodiment, the accessory load management module 155 controls energy consumption (and, management in general) based on reaction times for an electrically-powered accessory. As mentioned above, reaction times may serve as the basis for the discretionary or critical classification (in some embodiments, the relatively more critical or relatively more discretionary classification). Accessories with relatively slower reaction times may be classified as relatively more critical and merely commanded to a lower operating state as compared to completely disengaged. These accessories may then be able to react to a change in demand in an acceptable amount of time without sacrificing vehicle operability and durability. Accessories with relatively faster reaction times may be classified as relatively more discretionary and can be completely disengaged and/or operated at a lower operating state. Example operating commands are described below. The standards for an acceptable amount of time and reaction times may be based on experimental data specific to various engine, vehicle, and accessory configurations. Furthermore, the accessory load management module 155 may include specific power management control processes for each electronically-powered vehicle accessory. Example processes are shown in FIGS. 4-9.

In another embodiment, the command from the accessory load management module 155 may be based on an energy consumption amount to activate the electrically-powered vehicle accessory. Accordingly, electrically-powered vehicle accessories that consume relatively more energy to activate (i.e., start) are only operated at a lower operating state and electrically-powered vehicle accessories that consume relatively less energy to activate are either operated at a lower operating state or deactivated. In turn, overall energy consumption may be minimized by substantially avoiding start/stop situations with accessories that consume the most or a relatively greater amount of energy to become activated while accessories that consume relatively smaller amounts of energy to become activated may be start/stopped. In this configuration, accessories that consume relatively smaller amounts of energy to become activated may be classified as discretionary or relatively more discretionary accessories while accessories that consume relatively more energy to become activated may be classified as critical or relatively more critical accessories. According to various alternate embodiments, the energy consumption basis may be based on an energy amount to sustain operation of an accessory at a preset standard as compared to activating that accessory. This is widely configurable and may change based on the application. The standards that define relatively low or relatively lower energy consumption and high or relatively higher energy consumption may be based on experimental data specific to various engine, vehicle, and accessory configurations and the accessories themselves. For example, one embodiment may define high/low energy consumption on an absolute scale, which may be based on the accessory-engine-vehicle configuration and/or the accessory themselves (e.g., accessories that have a sustainable operating power of less than 5 Watts are low consumption, accessories that have a starting operating power of greater than 20 Watts are high consumption, etc.). In this example, a spectrum, table, scale, etc. may be used that lists the accessories of the vehicle and their relative normal operating power, peak operating power, starting operating power, etc. In other embodiments, a different quantifier or a quantifier used in connection with the absolute quantifier may be used to determine high/low energy consumptions. In some embodiments, an energy consumption quantifier is determined based on current operating conditions of a vehicle and/or engine. For example, a vehicle coasting down a hill with ample regenerative energy may consider accessory energy consumption differently than a vehicle parked and operating hotel loads (e.g., power-consuming convenience ems such as a radio, etc.) solely from a battery. These standards may also be definable by a user and/or be preset with the module 155.

Management of critical (or relatively more critical) accessories involves avoiding or rarely turning the device completely off but, rather, driving it to a lower energy consumption mode when possible. Often this is a matter of providing a command to run the device (i.e., accessory) at a lower operating state, such as a lower speed or pressure, when the immediate demand is low. In one embodiment, the degree of reduction (i.e., lower operating state) must match or substantially match the device reaction time when compared to the ability of the demand to change. For example, a power steering pump does not need to be run at full power all the time. The torque required to turn the wheels in a vehicle is generally inversely proportional to vehicle speed (the unaided steering wheel of a stationary vehicle requires relatively more force to turn than that of a fast moving vehicle). Since vehicle speed changes relatively slow, the power steering pump operating load or speed can be reduced a great deal with little risk of suddenly having to bring the pump quickly up to max speed because of a sudden demand change. A similar approach may be used for an engine coolant pump, whose operating mode need only be responsive enough to accommodate the demand. In other words, critical or relatively more critical loads do not need to be responsive to availability of free energy. The controller 150 provides commands to control their energy consumption based substantially only on the changing demand for their primary function (i.e., their ability to react). Data may be acquired via sensor 140 regarding operation of the vehicle, the controller 150 determines that demand of one or more critical accessories is low and provides a command to operate that accessory at a relatively lower operating state as compared to completely turning the accessory off. This avoids inefficiencies due to starting/stopping, substantially achieves drivability and durability goals for the vehicle, and also reduces overall energy consumption.

In comparison, management of discretionary or relatively more discretionary accessories may be substantially based on the ability to respond to both the changing demand and the changing availability of low-cost or free energy. In one embodiment, getting a device to be able to respond to a split-second energy availability event (e.g., braking) requires monitoring of the device inertia. This may be achieved via calibration, or inertia may be derived via data acquired by a sensor, such as sensor 140 that is operatively coupled to the device. For example, a speed sensor may be attached to a fan to monitor its speed and therefore, inertia. If the device and driving motor have a high inertia, then it is not practical to shut the device down if quick and immediate re-engagement is the goal (i.e., response to demand would be adversely impacted). Rather, the command may include unloading or disengaging the device while maintaining a moderate speed. For example, in the case of an air compressor it would be possible to vent the compressor output to the atmosphere, removing all of the power consumption except for friction. In another example, a clutch may be inserted between the driving motor and the compressor hardware, with the motor kept spinning while the clutch is disengaged (from the command from the controller 150) and the compressor is allowed to stop.

Thus, critical or relatively more critical electrically-powered vehicle accessories are rarely completely disengaged (rather, operated at a lower energy consumption level) while discretionary or relatively more discretionary electrically-powered vehicle accessories may be selectively deactivated (i.e., turned off) based on their ability to respond to demand for their function and engine loading. Accordingly, based on the classification, different power management strategies are used with differently classified accessories.

As mentioned above, the free energy module 157 is structured to determine when free energy is available while the prioritization module 156 is structured to prioritize the electrically-powered vehicle accessories. Regarding the presence of free energy, accessories with the greatest energy storage capability may be the highest priority devices to be managed during braking or "free energy" events. Devices without energy storage capability may not be affected at all. This is due to the fact that the use of additional energy may substantially always be acceptable due to the storage aspect of these accessories. The accumulator or storage element is increased during free energy events, such that the additional energy accumulated may be expelled at a later date when free energy is not available to offset a would-be energy expenditure. In this case, the use of energy to charge these devices is reduced.

Figure 3:
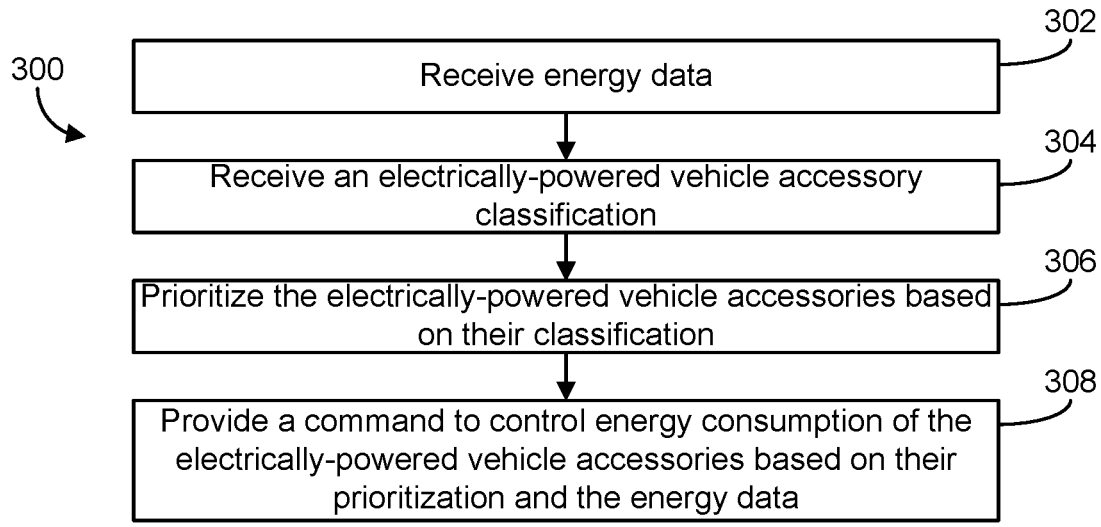
FIG. 3 is a flow diagram of a method of controlling electrically-powered vehicle accessories, according to an example embodiment.

Referring now to FIG. 3, a method 300 of dynamic accessory load management is shown according to an example embodiment. In one example embodiment, method 300 may be implemented with the controller 150 of FIG. 1. Accordingly, method 300 may be described in regard to FIG. 1.

During or prior to operation of the vehicle, the controller 150 receives classification (process 304) and prioritization (process 306) of the electrically-powered vehicle accessories. As mentioned above, in one embodiment, the classification includes a spectrum position from discretionary to critical electrically-powered vehicle accessories. Accordingly, electrically-powered vehicle accessories may fall anywhere within that spectrum (i.e., relatively more critical versus relatively more discretionary). This configuration may be used to further customize and manage electrically-powered vehicle accessories. For example, an engine coolant pump and a power steering pump may both be classified generally as critical accessories, however, due to various encountered driving conditions (e.g., engine idle), the engine coolant pump is classified as relatively more critical. In this case, management may be itemized based on the accessory itself relative to the other electrically-powered accessories. In another embodiment, the classification includes a binary classification of either critical or discretionary. In certain other embodiments, the classification may further include whether the accessory has an energy storage component. In one embodiment, relatively more critical (or, just critical) or relatively more discretionary (or, just discretionary) classification may be based on reaction times for the accessory while prioritization of the accessories is based on classification. In other embodiments, as described above, relatively more critical (or, just critical) or relatively more discretionary (or, just discretionary) classification may be based on an energy consumption amount to activate the accessory. In alternate embodiments, the prioritization may be adjusted via an operator interface, such as input/output device 160. Process 306, prioritization, is structured to impact how electrically-powered accessories are managed to reduce overall energy consumption.

At process 302, the controller 150 receives energy data, which provides an indication of the availability of free energy. As mentioned above, the free energy may correspond with energy at a relatively lower cost and/or energy that is otherwise lost (e.g., reclaimed from a regenerative braking system). This energy data may include, but is not limited to, data that provides an indication of when an energy recovery system, such as energy recovery system 130, is active on a vehicle. This energy data may include, but is not limited to, data that provides an indication when the various vehicular accessories are at full energy consumption, operating at a lower than full energy consumption level, and are off (e.g., little to no energy consumption). Based on the energy data and the prioritization schedule, the controller 150 provides a command to control energy consumption of the electrically-powered vehicle accessories (process 308).

An example implementation of process 300 may be as follows. A user may classify each electrically-powered vehicle accessory in their vehicle. In some embodiments, the classification may be preset for the electrically-powered vehicle accessories for the vehicle. In this example, the classification is binary in nature: critical or discretionary. However, the classification also includes whether the accessory has an energy storage component. During operation of the vehicle, the controller provides commands to manage the electrically-powered accessories with such management being based on the classification. As mentioned above, critical accessories are rarely completely disengaged but may be operated at lower states while discretionary accessories may be operated at lower states and/or completely disengaged. In addition this control strategy, controller is continuously or periodically receiving data that indicates whether free energy is available. When free energy is available, the controller is providing a command to use at least some of the free energy to charge an accessory (critical and discretionary) with a storage component. As such, energy may be accumulated and saved by those components for later use to reduce future energy consumption. Similarly, the prioritization enables energy to be directed to components most necessary for operation while reducing energy consumption by other components in order to reduce overall energy consumption. In some embodiments, a user may re-prioritize or classify different accessories. For example, an air conditioning system may be classified as discretionary but it is extremely important to a user who then re-classifies it as critical. Accordingly, the air conditioning system is rarely completely disengaged in order to be able to quickly respond to the user's desires.

Referring now to FIGS. 4-9, example control processes for critical and discretionary classified electrically-powered vehicle accessories are shown according to example embodiments. In this example, the power steering pump (FIG. 4) is classified as relatively more critical while the air compressor (FIGS. 5-9) is classified as relatively more discretionary. Further, the control blocks shown in FIGS. 4-9 may be embodied in one or more modules within the controller 150.

Figure 4:
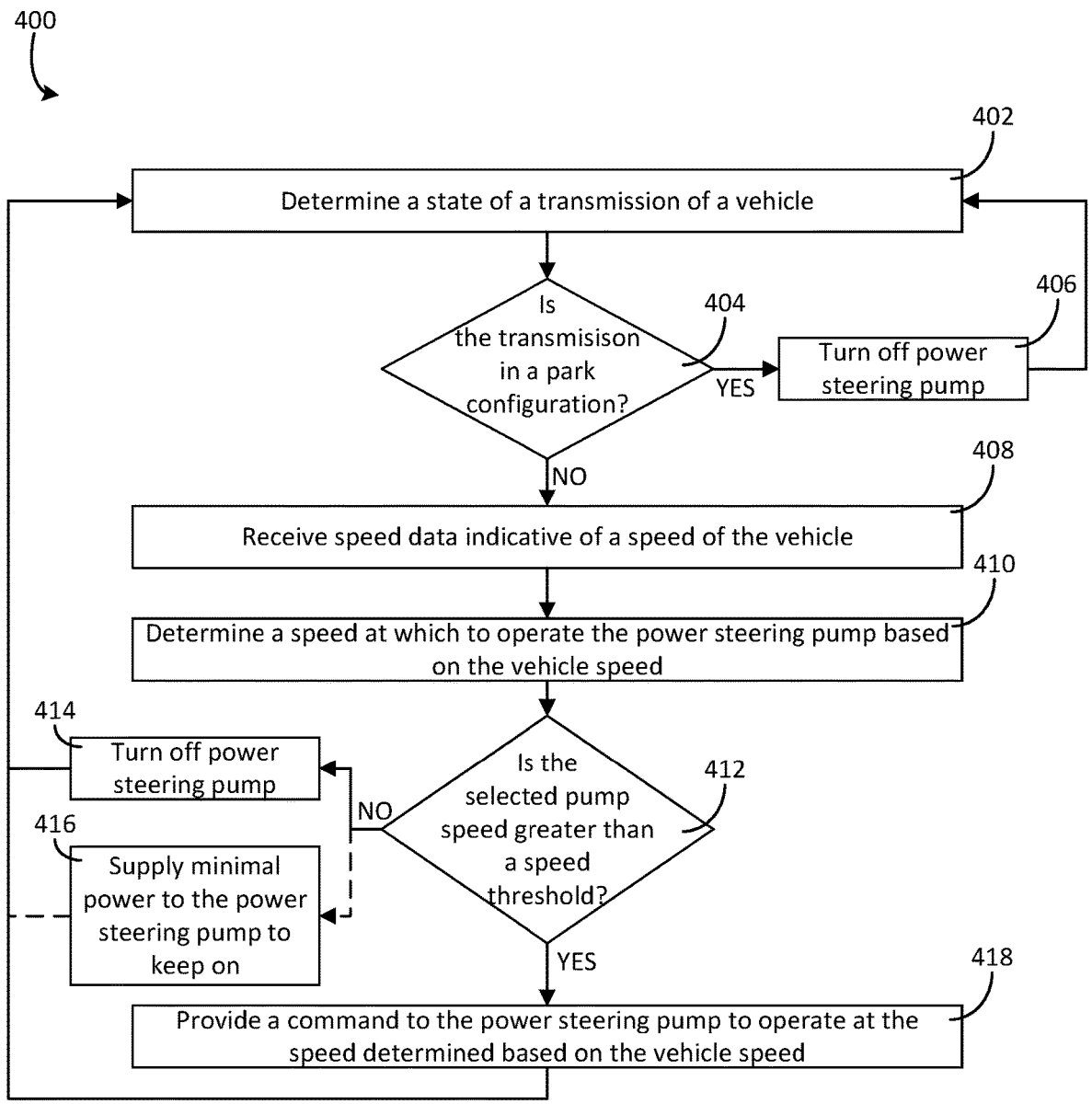
FIG. 4 is a flow diagram of a control process for a power steering pump, according to an example embodiment.

Accordingly, FIG. 4 shows an example control process 400 for a power steering pump, a relatively more critical electrically-powered vehicle accessory. As described above, usually a relatively higher pump speed is needed for stationary vehicles while a lower pump speed is adequate for moving vehicles. Thus, at process 402, the controller 150 is structured to determine a state of a transmission of a vehicle. At process 404, the controller 150 is structured to determine whether the transmission is in a park configuration. When the transmission is in park configuration, the power steering pump is deactivated by the controller 150 to conserve energy (process 406). If the transmission is not in the park configuration, the controller 150 is structured to receive speed data indicative of a speed of the vehicle (process 408).

At process 410, the controller 150 is structured to determine a speed at which to operate the power steering pump based on the vehicle speed. In one embodiment, the corresponding power steering pump speed is linearly related to the vehicle speed. In another embodiment, the corresponding power steering pump speed is non-linearly related to the vehicle speed. As an example, faster vehicle speeds yield relatively lesser wheel resistances such that lower pump speeds may be utilized. Alternatively, at zero vehicle speed wheel resistance can be quite high such that higher or even maximum pump speeds may be utilized. If this determined power steering pump speed is sufficiently low so as to be below a speed threshold (process 412), the power steering pump is deactivated by the controller 150 to conserve energy (process 414). In an alternative embodiment, the controller 150 is structured to supply a minimal amount of power to the power steering pump to keep it on (process 416). The minimal amount of power may be an amount to increase the reaction time by a predefined amount, percentage, or other quantifiable variable; may be an amount that operates the power steering pump at a lower operating state; may be a predefined power amount (e.g., 5 watts, etc.); etc. In this regard, those of ordinary skill in the art will appreciate that the minimum amount is a highly configurable value. If the selected power steering pump speed is above the speed threshold, the controller 150 provides the command to the power steering pump to optimize control of the pump (i.e., to operate at the speed determined based on the vehicle speed) (process 418). Although a power steering pump is classified as critical, the controller 150 recognizes certain operation conditions (e.g., the transmission in park, etc.) that provide opportunities to disengage/deactivate the power steering pump.

In comparison, FIGS. 5-9 depict an example control process for a relatively more discretionary accessory—the air compressor. As a brief overview, the controller 150 provides a command to turn ON or activate the compressor if free energy is available (because the air compressor has a storage tank) or if the pressure is below a minimum threshold (i.e., the cut-in pressure). The controller 150 provides a command to turn OFF or deactivate the compressor if the pressure in the tank is at a maximum level (i.e., the cut-out pressure), the engine is idling, and/or the engine load is relatively high (e.g., at or above a preset threshold). When the engine load is high, the alternator is generating substantial amounts of energy such that the air compressor may be restarted quickly. In comparison, when the engine is idling, the alternator may be generating a relatively less amount of energy such that energy consumption is reduced by deactivating the compressor. However, in this instance, deactivation is also based on demand: if the operator is using the compressor, despite the engine idling, this situation may override the control process.

Figure 5:
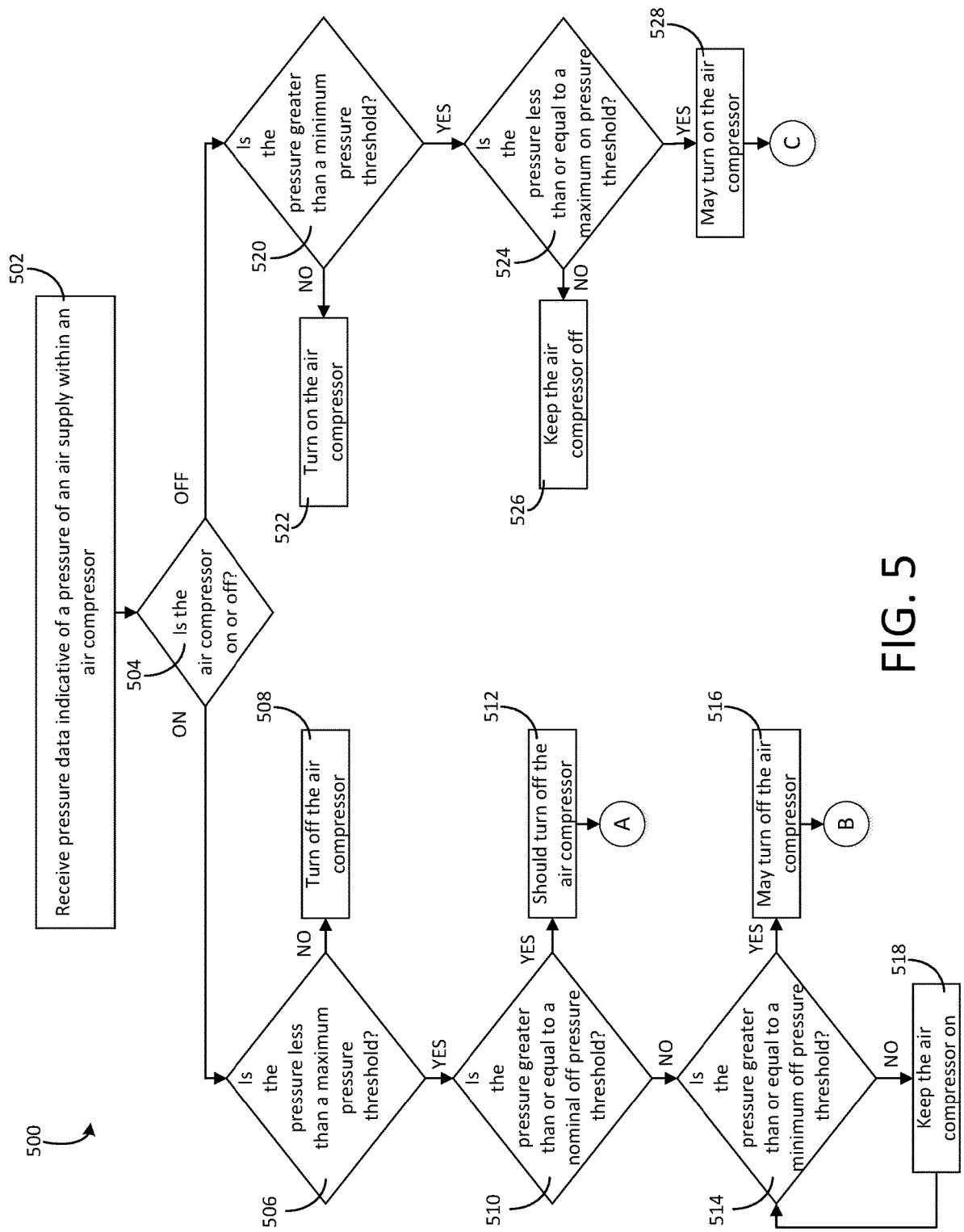
FIGS. 5-9 are flow diagrams of control processes for an air compressor, according to example embodiments.

Referring now to FIG. 5, a method 500 of analyzing the pressure within an air compressor is shown according to an example embodiment. In one example embodiment, method 500 may be implemented with the controller 150 of FIGS. 1-2. Accordingly, method 500 may be described in regard to FIG. 1-2. At process 502, the controller 150 is structured to receive pressure data indicative of a pressure of an air supply within an air compressor. At process 504, the controller 150 is structured to determine whether the air compressor is on or off. If the air compressor is on, processes 506-518 may be performed. If the air compressor is off, processes 520-528 may be performed.

At process 506, the controller 150 is structured to determine whether the pressure is less than a maximum pressure threshold as the air compressor is filling. The maximum pressure threshold may represent the maximum allowable pressure for the air compressor (e.g., a design limit, etc.). If the pressure is greater than or equal to the maximum pressure threshold, the controller 150 is structured to turn off or deactivate the air compressor (process 508).

If the pressure is less than the maximum pressure threshold, the controller 150 is structured to determine whether the pressure is greater than or equal to a nominal off pressure threshold. (process 510). The nominal off pressure threshold may represent a pressure at which the air compressor should be shut off if the pressure exceeds the nominal off pressure threshold (e.g., based on the availability of free energy, vehicle operating conditions, etc.). If the pressure is greater than or equal to the nominal off pressure threshold, the controller 150 is structured to determine whether the air compressor should be turn off (e.g., based on the availability of free energy, vehicle operating conditions, etc.) (process 512) (see FIG. 9).

If the pressure is less than the nominal pressure threshold, the controller 150 is structured to determine whether the pressure is greater than or equal to a minimum off pressure threshold (process 514). The minimum off pressure threshold represents a pressure at which the air compressor may be shut off while charging (e.g., refilling, compressing air, etc.). If the pressure is greater than or equal to the minimum off pressure threshold, the controller 150 is structured to determine whether the air compressor may be turned off (e.g., based on the availability of free energy, vehicle operating conditions, etc.) (process 516) (see FIG. 9). If the pressure is less than the minimum off pressure threshold, the controller 150 is structured to keep the air compressor on to further charge (e.g., refill, compress air, etc.).

At process 520, the controller 150 is structured to determine whether the pressure is greater than a minimum pressure threshold. The minimum pressure threshold represents a minimum allowable pressure within the air compressor tank (e.g., such that critical components may always have a compressed air supply, etc.). If the pressure is less than the minimum pressure threshold, the controller 150 is structured to charge (i.e., turn on, etc.) the air compressor (e.g., even if free energy is unavailable, etc.) (process 522).

If the pressure is greater than the minimum pressure threshold, the controller 150 is structured to determine whether the pressure is less than or equal to a maximum on pressure threshold (process 524). The maximum on pressure threshold represents a pressure at which the compressor may be turned on at if the pressure is less than the maximum on pressure threshold. If the pressure is greater than the maximum on pressure threshold, the controller 150 keeps the air compressor off (process 526). If the pressure is less than or equal to the maximum on pressure threshold, the controller 150 may turn on the air compressor (e.g., based on the availability of free energy, vehicle operating conditions, etc.) (process 528) (see FIG. 9).

Figure 6:
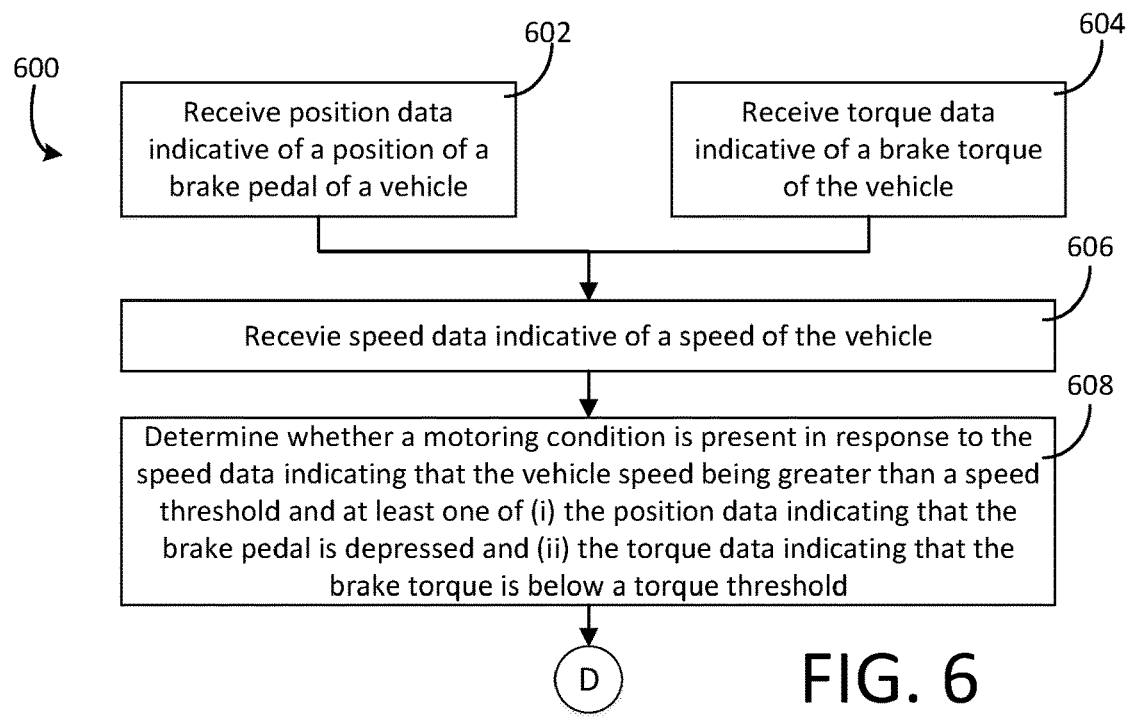

Referring now to FIG. 6, a method 600 for determining whether a motoring condition is present is shown according to an example embodiment. In one example embodiment, method 600 may be implemented with the controller 150 of FIGS. 1-2. Accordingly, method 600 may be described in regard to FIGS. 1-2. At process 602, the controller 150 is structured to receive position data indicative of a position of a brake pedal of the vehicle. In other embodiments, a braking condition is otherwise determined. At process 604, the controller 150 is structured to receive torque data indicative of a brake torque of the vehicle. At process 606, the controller 150 is structured to receive speed data indicative of a speed of the vehicle. At process 608, the controller 150 is structured to determine whether a motoring condition is present (i.e., free energy is available). The determination of the motoring condition may be based on at least one of (i) the position of data indicating that the brake pedal is depressed (i.e., the vehicle is braking) and (ii) the torque data indicating that the brake torque is below a torque threshold, while the determination from the speed data that the vehicle speed is greater than a speed threshold indicates that there is sufficient free energy worth capturing.

Figure 7:
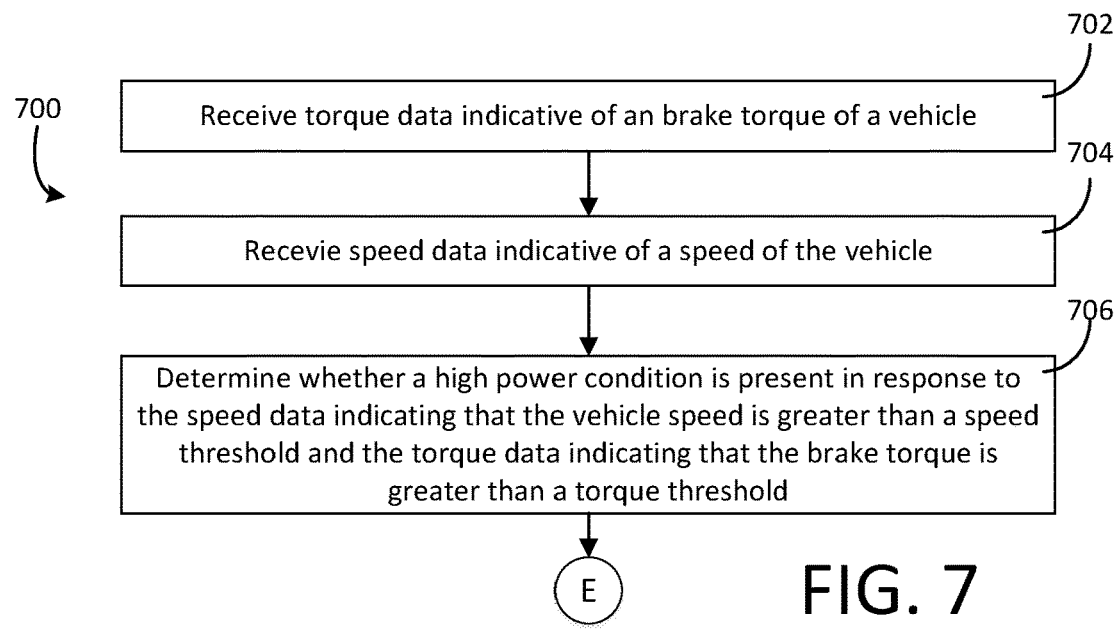

Referring now to FIG. 7, a method 700 for determining whether a high power condition is present is shown according to an example embodiment. In one embodiment, the high power condition may correspond with a power output from the engine above a predefined threshold. In another embodiment, the high power condition may correspond with an explicit user input. In still another embodiment, the high power condition may correspond with at least one of an engine speed and torque above a predefine threshold. For example, the determination of the high power condition may be based on the torque data indicating that the brake torque is greater that a torque threshold. In another embodiment, the determination of a high power condition for purposes of controlling accessories further includes that the vehicle speed is greater than a speed threshold.

In one example embodiment, method 700 may be implemented with the controller 150 of FIGS. 1-2. Accordingly, method 700 may be described in regard to FIGS. 1-2. At process 702, the controller 150 is structured to receive torque data indicative of a brake torque of a vehicle. At process 704, the controller 150 is structured to receive speed data indicative of a speed of the vehicle. At process 706, the controller 150 is structured to determine whether a high power condition is present. When the engine load is high, the vehicle drivetrain may be highly loaded (e.g., during hard acceleration, when climbing a steep grade, etc.), and it may be desirable to minimize the power consumed by accessories when possible and practical. Thus, the air compressor may be turned off in this instance.

Figure 8:
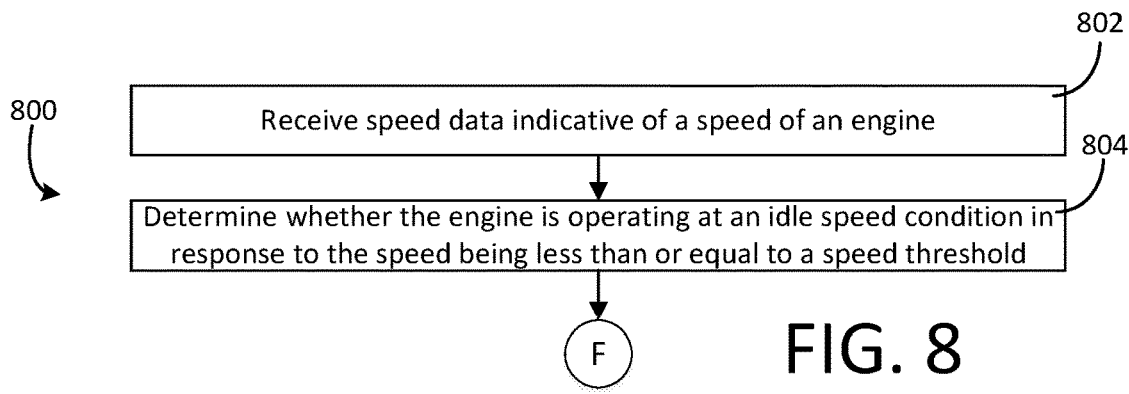

Referring now to FIG. 8, a method 800 for determining whether an idle condition is present is shown according to an example embodiment. In one example embodiment, method 800 may be implemented with the controller 150 of FIGS. 1-2. Accordingly, method 800 may be described in regard to FIGS. 1-2. At process 802, the controller 150 is structured to receive speed data indicative of a speed of an engine. At process 804, the controller 150 is structured to determine whether the engine is operating at an idle condition in response to the speed being less than or equal to a speed threshold. By way of example, when the engine is idling, the alternator may be capable of generating a relatively less amount of energy such that energy consumption is reduced by deactivating the compressor.

Figure 9:
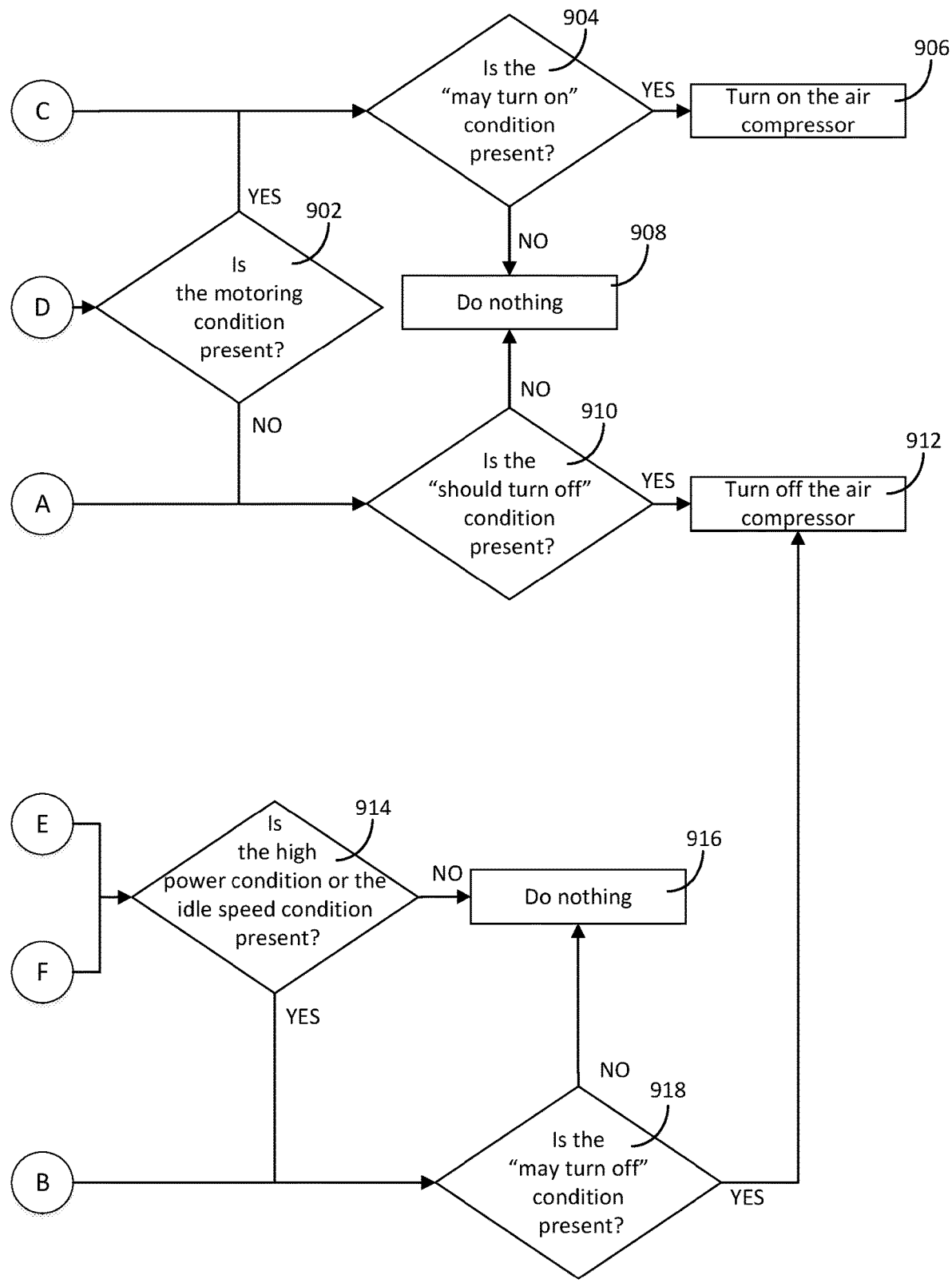

Referring now to FIG. 9, a method 900 for determining whether an air compressor should be turned on or off is shown according to an example embodiment. In one example embodiment, method 900 may be implemented with the controller 150 of FIGS. 1-2 and the determinations made in methods 500, 600, 700, and 800 of FIGS. 5-8. Accordingly, method 900 may be described in regard to FIGS. 1-2 and 5-8.

At process 902, the controller 150 is structured to determine whether the motoring condition is present (see, e.g., FIG. 6). At process 904, the controller 150 is structured to determine whether the "may turn on" condition is present. If the motoring condition is present (i.e., free energy is available) and the "may turn on" condition is present (e.g., the air compressor is off and the pressure is less than or equal to the maximum on pressure threshold, processes 524 and 528, etc.), the controller 150 is structured to turn on the air compressor (process 906). If the motoring condition is present, but the "may turn on" condition is not present, the controller 150 is structured to do nothing (e.g., leave the air compressor off, etc.) (process 908). In some embodiments, if the motoring condition is not present, the air compressor is off, and the pressure is less than or equal to the maximum on pressure threshold, the controller 150 may not turn on the air compressor (e.g., if the pressure is above the minimum pressure threshold, etc.).

At process 910, the controller 150 is structured to determine whether the "should turn off" condition is present. If the motoring condition is not present and the "should turn off" condition is present (e.g., the air compressor is on and the pressure is greater than the nominal off pressure threshold, processes 510-512, etc.), the controller 150 is structured to turn off the air compressor (process 912). If the motoring condition is not present and the "should turn off" condition is not present, the controller 150 is structured to do nothing (e.g., leave the air compressor on, etc.) (process 908). In some embodiments, if the motoring condition is present, the air compressor is on, and the pressure is greater than the nominal off pressure threshold (see, e.g., processes 510-512), the controller 150 is structured to keep the air compressor on.

At process 914, the controller 150 is structured to determine whether the high power condition (see, e.g., FIG. 7) or the idle speed condition (see, e.g., FIG. 8) is present. If the high power condition or the idle speed condition is present and the "may turn off" condition is present (e.g., the air compressor is on and the pressure is greater than or equal to the minimum off pressure threshold, processes 514-516, etc.), the controller 150 is structured to turn off the air compressor (process 912). Conversely, if the air compressor is on and the pressure is greater than or equal to the minimum off pressure threshold (e.g., the "may turn off" condition, etc.), but the high power condition and the idle speed condition are not present, the controller 150 may be structured to do nothing (e.g., leave the air compressor on, etc.) (process 916). Further, if the high power condition or the idle speed condition is present, but the "may turn off" condition is not present (e.g., the air compressor is on, but the pressure is less than or equal to the minimum off pressure threshold, processes 514-516, etc.), the controller 150 is structured to do nothing (e.g., leave the air compressor on, etc.) (process 916).

It should be noted that the example processes shown in FIGS. 4-9 are for example purposes only such that other control processes may be used which fall within the spirit and scope of the present disclosure. As such, it should also be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method, comprising:
   determining a transmission of a vehicle is in a non-park setting;
   in response to determining the transmission of the vehicle is in the non-park setting, receiving speed data indicative of a speed of the vehicle;
   determining a speed to operate a vehicle accessory based on the vehicle speed, wherein greater vehicle speeds correspond with lower determined speeds to operate the vehicle accessory;
   comparing the determined speed to operate the vehicle accessory to a speed threshold; and
   in response to determining that the determined speed is below the speed threshold, providing a command to the vehicle accessory to one of deactivate the vehicle accessory or operate the vehicle accessory at a reduced operating state relative to a current operating state of the vehicle accessory.

2. The method of claim 1, wherein the vehicle accessory is a power steering pump.

3. The method of claim 1, wherein the reduced operating state corresponds with a predefined power consumption amount for the vehicle accessory.

4. The method of claim 1, further comprising:
   determining the transmission is in a park setting; and
   deactivating the vehicle accessory.

5. The method of claim 4, wherein the vehicle accessory is a power steering pump.

6. The method of claim 1, wherein the determined speed to operate the vehicle accessory is linearly related to the vehicle speed.

7. The method of claim 1, wherein the vehicle accessory is an electrically-driven vehicle accessory.

8. A system, comprising:
   a vehicle accessory; and
   a controller coupled to the vehicle accessory, the controller structured to:
      determine a transmission of a vehicle is in a non-park setting;
      receive speed data indicative of a speed of the vehicle;
      determine a speed to operate the vehicle accessory based on the vehicle speed, wherein greater vehicle speeds correspond with lower determined speeds to operate the vehicle accessory;
      compare the determined speed to operate the vehicle accessory to a speed threshold; and
      in response to determining that the determined speed is below the speed threshold, provide a command to the vehicle accessory to one of deactivate the vehicle accessory or operate the vehicle accessory at a reduced operating state relative to a current operating state for the vehicle accessory.

9. The system of claim 8, wherein the vehicle accessory is a power steering pump.

10. The system of claim 8, wherein the reduced operating state corresponds with a predefined power consumption amount for the vehicle accessory.

11. The system of claim 8, wherein the controller is further structured to:

determine the transmission is in a park setting; and
deactivate the vehicle accessory.

12. The system of claim 11, wherein the vehicle accessory is a power steering pump.

13. The system of claim 8, wherein the determined speed to operate the vehicle accessory is linearly related to the vehicle speed.

14. The system of claim 8, wherein the vehicle accessory is an electrically-driven vehicle accessory.

15. A system for a vehicle, the system comprising:
a controller including at least one processor coupled to a memory storing instructions that, when executed by the at least one processor, cause operations including:
determine a transmission of a vehicle is in a non-park setting;
receive speed data indicative of a speed of the vehicle;
determine a speed to operate a vehicle accessory based on the vehicle speed, wherein greater vehicle speeds correspond with lower determined speeds to operate the vehicle accessory;
compare the determined speed to operate the vehicle accessory to a speed threshold; and
in response to determining that the determined speed is below the speed threshold, provide a command to the vehicle accessory to one of deactivate the vehicle accessory or operate the vehicle accessory at a reduced operating state relative to a current operating state for the vehicle accessory.

16. The system of claim 15, wherein the vehicle accessory is a power steering pump.

17. The system of claim 15, wherein the reduced operating state corresponds with a predefined power consumption amount for the vehicle accessory.

18. The system of claim 15, wherein the operations further include:
determine the transmission is in a park setting; and
deactivate the vehicle accessory.

19. The system of claim 18, wherein the vehicle accessory is a power steering pump.

20. The system of claim 15, wherein the determined speed to operate the vehicle accessory is linearly related to the vehicle speed.

* * * * *